United States Patent
Sawada

(10) Patent No.: US 12,508,954 B2
(45) Date of Patent: Dec. 30, 2025

(54) SEAT

(71) Applicant: SUBARU CORPORATION, Tokyo (JP)

(72) Inventor: Naomichi Sawada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 287 days.

(21) Appl. No.: 18/203,762

(22) Filed: May 31, 2023

(65) Prior Publication Data

US 2024/0001810 A1 Jan. 4, 2024

(30) Foreign Application Priority Data

Jun. 30, 2022 (JP) ................................. 2022-105510

(51) Int. Cl.
*B60N 2/02* (2006.01)
*B60W 40/06* (2012.01)

(52) U.S. Cl.
CPC ........... *B60N 2/0244* (2013.01); *B60W 40/06* (2013.01); *B60N 2/0272* (2023.08)

(58) Field of Classification Search
CPC .. B60N 2/0244; B60N 2/02246; B60N 2/026; B60N 2/0272; B60N 2/4228
See application file for complete search history.

(56) References Cited

U.S. PATENT DOCUMENTS

| | | | |
|---|---|---|---|
| 2019/0248260 A1 | 8/2019 | Yoshikawa et al. | |
| 2019/0366888 A1 | 12/2019 | Saigo et al. | |
| 2020/0394426 A1* | 12/2020 | Ro | G05D 1/0094 |
| 2023/0339379 A1* | 10/2023 | Huang | B60R 21/2334 |

FOREIGN PATENT DOCUMENTS

| | | |
|---|---|---|
| JP | 2007-331650 A | 12/2007 |
| JP | 2019-137286 A | 8/2019 |
| JP | 2019-209733 A | 12/2019 |
| JP | 2020-50255 A | 4/2020 |

* cited by examiner

*Primary Examiner* — Charles J Han
(74) *Attorney, Agent, or Firm* — MCGINN I.P. LAW GROUP, PLLC

(57) ABSTRACT

A seat includes a seat surface member, a seat back, a rigidity changer, a steering operation prediction unit, and a rigidity change controller. On the seat surface member, a waist and thighs of an occupant who is to perform steering operation on a vehicle are to be placed. The seat back is configured to abut on a back of the occupant. A rigidity changer is configured to change rigidity of a part of the seat back abutting on the vicinity of shoulder blades of the occupant. A steering operation prediction unit is configured to predict whether the steering operation is performed. A rigidity change controller is configured to control the rigidity changer to enhance the rigidity before the steering operation is started when it is predicted that the steering operation is performed.

20 Claims, 5 Drawing Sheets

SEAT

CROSS-REFERENCE TO RELATED APPLICATIONS

The present application claims priority from Japanese Patent Application No. 2022-105510 filed on Jun. 30, 2022, the entire contents of which are hereby incorporated by reference.

BACKGROUND

The disclosure relates to a seat onboard, for example, a vehicle for seating an occupant thereon.

As a technique related to control over a vehicle seat, Japanese Unexamined Patent Application Publication (JP-A) No. 2019-209733, for example, describes appropriately controlling, for retaining an occupant's posture, a shoulder support that supports upper arms from laterally, armrests, and a seat tilting member based on a seated state of an occupant including a weight of the occupant seated on the seat, an occupant's grip force detected by grip sensors, and an occupant's load detected by armrest sensors, and a lateral acceleration predicted based on a curvature of a road on which a vehicle runs and a vehicle speed.

JP-A No. 2007-331650 describes a steering support apparatus for improving steerability in a cramped posture in which an occupant's upper body is closer to a steering wheel. The steering support apparatus includes a seat back displacement member that can displace left and right shoulder members of at least left and right upper portions of a support surface that supports a vehicle driver in a seat back of a driver's seat in a vehicle rearward direction independently, and exercises a steering support control to displace at least the shoulder members on a side of a steering direction of the support surface, in the vehicle rearward direction.

JP-A No. 2019-137286 describes an occupant posture adjusting apparatus measuring a body pressure value of an occupant and adjusting a way to support the pelvis and shoulder blades to allow for an appropriate body pressure value of the occupant. The apparatus includes: a bottom part support member pivotally supported by a seat cushion immediately under a hip point to support thighs from below, a lower part support member pivotally supported by a seat back at a lower position than the seat back to support the pelvis from rearward, an upper part support member supporting the shoulder blades pivotally supported by the seat back at a higher position than the seat back from rearward, and a controller controlling a drive that drives the support members.

JP-A No. 2020-50255 describes a vehicle seat having a seat cushion and a seat back for making a forward visibility recognized by an occupant coincident with a physical running state of a vehicle and improving steering operability during turning, with a rigidity value of a seat surface of an outer part of the seat cushion in a turning direction being controlled to be higher than a rigidity value of the seat surface of an inner part in the turning direction when a steering angle sensor detects a turning running state.

SUMMARY

An aspect of the disclosure provides a seat. The seat includes a seat surface member, a seat back, a rigidity changer, a steering operation prediction unit, and a rigidity change controller. On the seat surface member, a waist and thighs of an occupant who is to perform steering operation on a vehicle are to be placed. The seat back is configured to abut on a back of the occupant. The rigidity changer is configured to change rigidity of a part of the seat back abutting on the vicinity of shoulder blades of the occupant. The steering operation prediction unit is configured to predict whether the steering operation is performed. The rigidity change controller is configured to control the rigidity changer to enhance the rigidity before the steering operation is started when it is predicted that the steering operation is performed.

An aspect of the disclosure provides a seat. The seat includes a seat surface member, a seat back, a rigidity changer, and circuitry. On the seat surface member, a waist and thighs of an occupant who is to perform steering operation on a vehicle are to be placed. The seat back is configured to abut on a back of the occupant. The rigidity changer is configured to change rigidity of a part of the seat back abutting on the vicinity of shoulder blades of the occupant. The circuitry is configured to predict whether the steering operation is performed. The circuitry is configured to control the rigidity changer to enhance the rigidity before the steering operation is started when it is predicted that the steering operation is performed.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

For improving easiness of steering operation by a vehicle driver, it is necessary to stop a upper body motion caused by an operation reaction force generated during the steering operation.

It is considered effective to increase rigidity for supporting shoulder blades to stop the upper body motion. However, simply improving the rigidity of the seat back to enhance the rigidity for supporting the shoulder blades may affect comfort (comfort to be seated on the seat) during normal running and whiplash protection performance in case of a rear-end collision.

It is desirable to provide a seat capable of improving operability of steering operation without affecting seat performance in normal use.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure.

Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The seat according to the embodiment is, for example, a seat that is used as a front seat (driver's seat) of a vehicle such as a passenger vehicle and on which an occupant 100 (driver) is seated.

Figure 1:
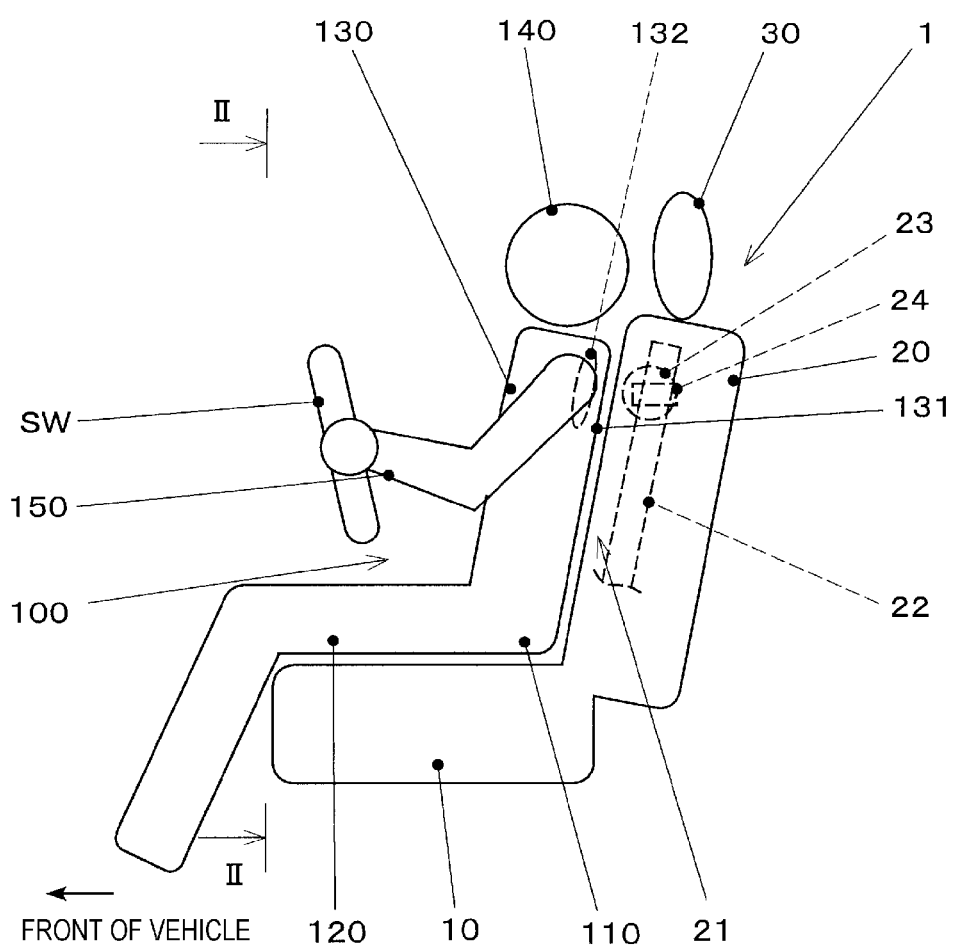
FIG. 1 is a schematic side view of a seat according to an embodiment of the disclosure.

FIG. 1 is a schematic side view of the seat according to the embodiment.

Figure 2:
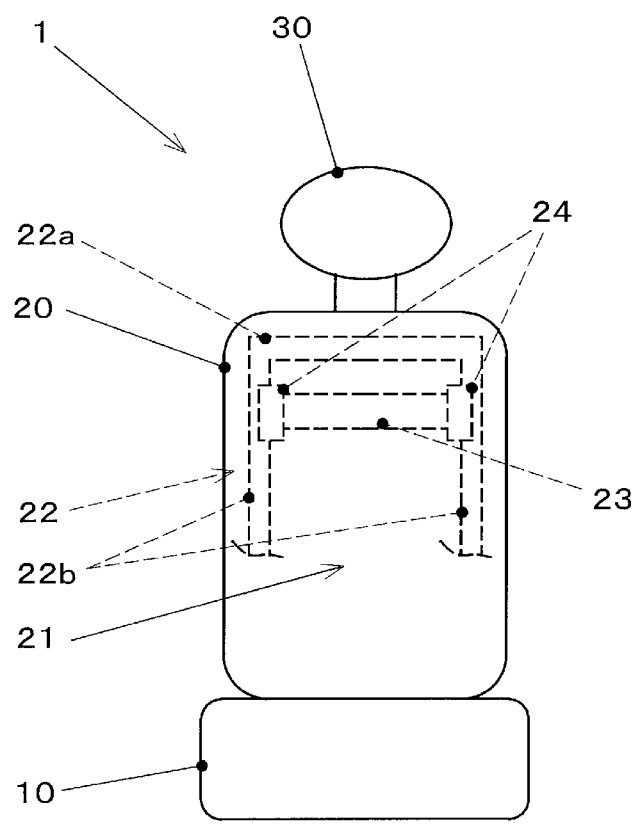
FIG. 2 is an arrow view of part II-II of FIG. 1.

FIG. 2 is an arrow view of part II-II of FIG. 1. In FIG. 2, the occupant 100 is not illustrated.

A seat 1 according to the embodiment includes a seat surface member 10, a seat back 20, a headrest 30, and the like.

The seat surface member (seat cushion) 10 is a part on which the waist 110 and thighs 120 of the occupant 100 who is a seated person are placed.

The seat back (backrest) 20 is a backrest part disposed along the back 131 of an upper body 130 of the occupant 100.

The seat back 20 extends upward from near a rear end of the seat surface member 10.

The headrest 30 protrudes upward from an upper end of the seat back 20 and supports a rear part of the head 140 of the occupant 100.

Furthermore, a steering wheel SW with which the occupant 100 performs steering operation using arms 150 is provided in front of the occupant 100.

When the occupant 100 performs the steering operation with the steering wheel SW, an operation reaction force against the steering operation is input from shoulder blades 132 through the back 131 to press the seat back 20 rearward.

In the seat back 20, a cushion 21, a frame 22, a shoulder blade support member 23, actuators 24, and the like are provided.

The cushion 21 is formed from an elastic porous material such as urethane foam.

A front surface of the cushion 21 is covered with a seat upholstery, not illustrated.

For example, a flexible membrane material such as fabric, knit, natural leather, and synthetic leather can be used as the seat upholstery.

The frame 22 is a frame-shaped structural member buried in the cushion 21 and receiving a load from the occupant 100 via the cushion 21.

The frame 22 is formed from a material harder than the cushion 21, for example, a metal material such as steel or an aluminum-based alloy.

Figure 3:
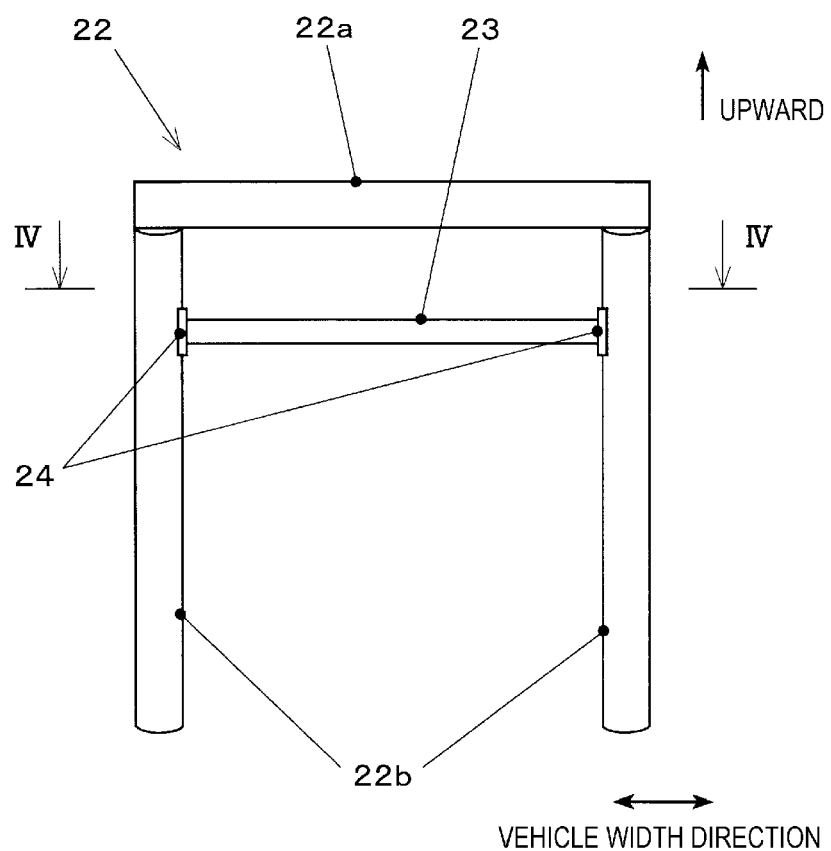
FIG. 3 is a schematic diagram illustrating a state of viewing a frame of a seat back in the seat according to the embodiment from a vehicle front side.

FIG. 3 is a schematic diagram illustrating a state of viewing the frame of the seat back from a vehicle front side.

Figure 4:
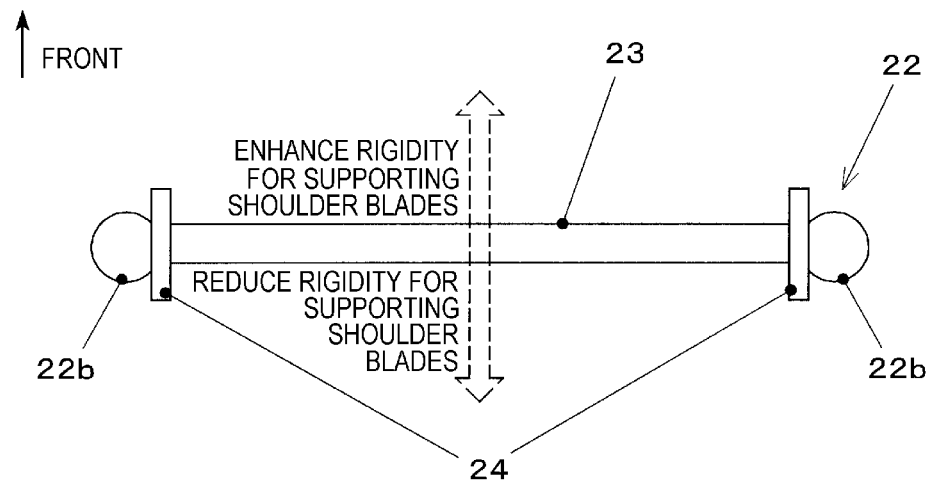
FIG. 4 is a schematic arrow view of part IV-IV of FIG. 3.

FIG. 4 is a schematic arrow view of part IV-IV of FIG. 3.

The frame 22 has an upper member 22a and side members 22b.

The upper member 22a is a beam-like member extending in a vehicle width direction (shoulder width direction of the occupant 100).

The upper member 22a is provided near the upper end of the seat back 20.

The side members 22b extend downward from left and right ends of the upper member 22a, respectively.

The side members 22b are disposed along side edges of the seat back 20.

The shoulder blade support member 23 is a beam-like member bridging between the left and right side members 22b.

The shoulder blade support member 23 is a hard member formed from a material harder than the cushion 21, for example, a metal material such as steel or an aluminum-based alloy.

The shoulder blade support member 23 is disposed in the rear of the shoulder blades 132 of the occupant 100 of a medium-sized build when the occupant 100 is seated in the seat 1.

The shoulder blade support member 23 can be disposed, for example, so that a height along a surface of the seat back 20 from the seat surface member 10 can cover a range of 455±15 mm.

The shoulder blade support member 23 is superimposed on at least part of the shoulder blades 132 when viewed from a longitudinal direction.

The shoulder blade support member 23 is opposed to the back 131 of the occupant 100, with part of the cushion 21 sandwiched between the shoulder blade support member 23 and the back 131.

The actuators 24 drive the shoulder blade support member 23 in the longitudinal direction (direction of approaching or separating from the upper body 130 of the occupant 100).

Each of the actuators 24 has, for example, an electric motor, a reduction gear, and a mechanism that transforms a rotational motion to a translational motion.

The actuators 24 are provided between two ends of the shoulder blade support member 23 and the left and right side members 22b, respectively.

The shoulder blade support member 23 and the actuators 24 work together as a rigidity changer that changes rigidity of a part of the seat back 20 abutting on the vicinity of the shoulder blades 132.

The seat 1 according to the embodiment has a control system 200 to be described below for controlling the actuators 24.

Figure 5:
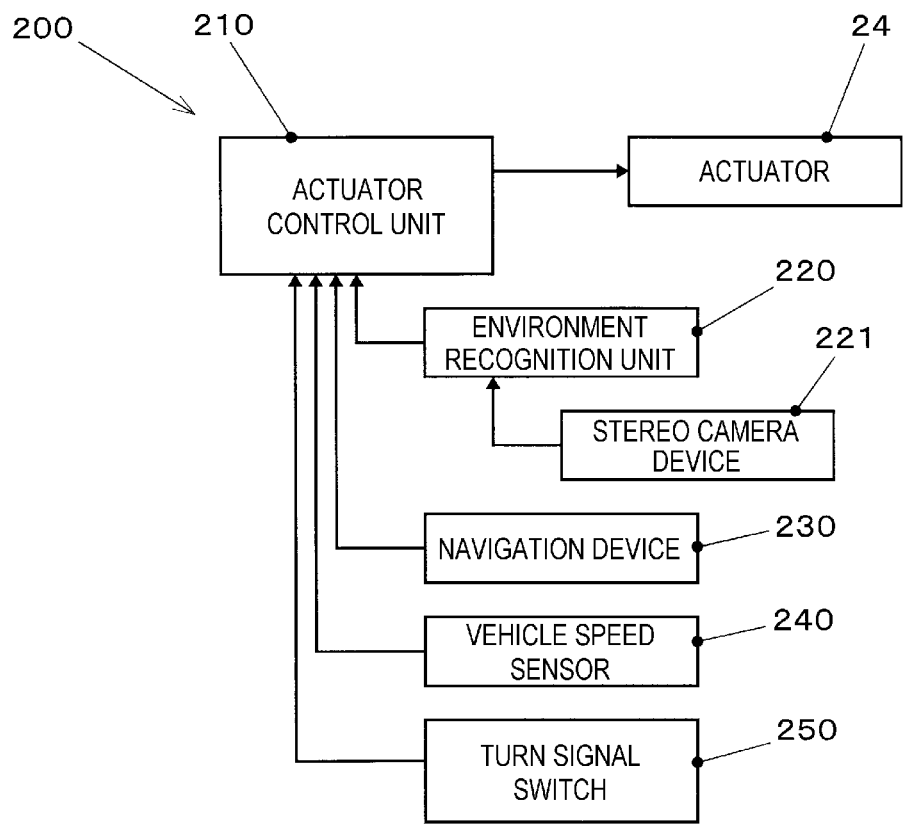
FIG. 5 illustrates configurations of a system that controls actuators in the seat according to the embodiment.

FIG. 5 illustrates configurations of the system that controls the actuators.

The control system 200 has an actuator control unit 210, an environment recognition unit 220, a navigation device 230, a vehicle speed sensor 240, a turn signal switch 250, and the like.

The actuator control unit 210 transmits an actuation instruction to the actuators 24 to control a longitudinal position of the shoulder blade support member 23.

In one embodiment, the actuator control unit 210 may serve as a "steering operation prediction unit" that predicts whether the occupant 100 performs steering operation within a predetermined time from a current time and a "rigidity change controller" that controls the actuators 24 to control the rigidity of the part of the seat back 20 that abuts on the vicinity of the shoulder blades 132.

In one embodiment, the actuator control unit 210 may serve as a "lateral acceleration estimation member" that estimates a lateral acceleration generated when a vehicle passes a curved road.

Functions and operations of the actuator control unit 210 will be described later in detail.

The environment recognition unit 220 recognizes a surrounding environment of the vehicle based on an output from a sensor such as a stereo camera device 221.

The stereo camera device 221 has a pair of cameras disposed apart in a transverse direction by a predetermined base line length with an imaging range facing a front of the vehicle, and an image processor that performs well-known stereo image processing on images captured by the cameras.

The environment recognition unit 220 recognizes a lane shape of a road that is present in the front of the vehicle and on which the vehicle is expected to run based on the output from the stereo camera device 221.

The environment recognition unit 220 estimates a curvature radius of a curved road when the curved road on which the vehicle is expected to pass within a predetermined time is present in front of the vehicle.

The navigation device 230 has a positioning device that determines positions of the vehicle using, for example, a GPS or a quasi-zenith satellites system (QZSS), and a storage medium storing map data.

The navigation device 230 serves to extract the curved road in front of the vehicle from the map data based on the positions, a moving direction, and a moving speed of the vehicle and to provide information related to the curvature radius of this curved road to the actuator control unit 210.

The actuator control unit 210, the environment recognition unit 220, and the navigation device 230 each has a microcomputer including, for example, an information processor such as a CPU, storages such as a RAM and a ROM, an input/output interface, and a bus connecting these elements.

The actuator control unit 210, the environment recognition unit 220, and the navigation device 230 are coupled either via, for example, an in-vehicle LAN such as a CAN communication system or directly.

The vehicle speed sensor 240 is a sensor that detects a traveling speed of the vehicle.

The vehicle speed sensor 240 is provided, for example, in a hub that rotatably supports wheels and that outputs a vehicle speed signal (typically, a pulse signal) in response to a rotational speed of the wheels.

The actuator control unit 210 computes the traveling speed of the vehicle based on the vehicle speed signal.

The turn signal switch 250 is an operation member (turn signal operation detector) with which the occupant 100 turns on or off (blinks or off) a turn signal lamp, not illustrated.

A state of the turn signal switch 250 is transmitted to a relay, not illustrated, supplying electricity to the turn signal lamp and to the actuator control unit 210.

Next, actions of the seat according to the embodiment will be described.

Figure 6:
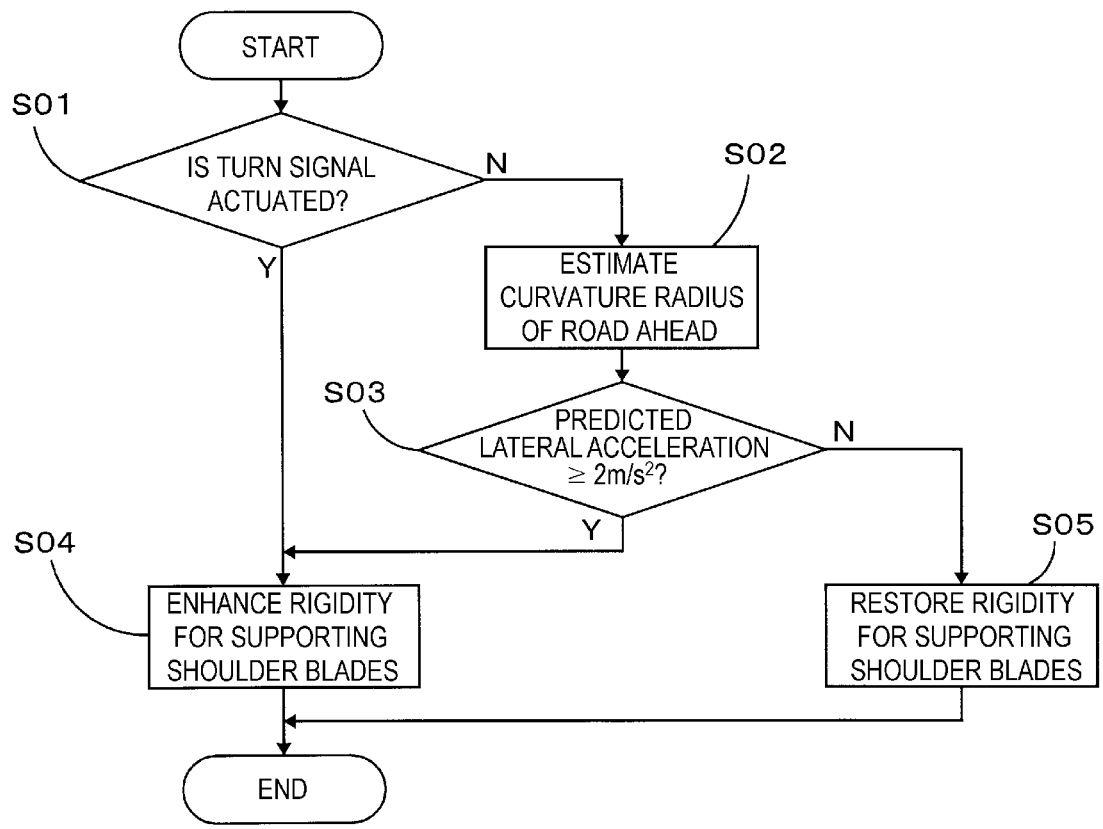
FIG. 6 is a flowchart illustrating control over the actuators in the seat according to the embodiment.

FIG. 6 is a flowchart illustrating control over the actuators in the seat according to the embodiment.

A process will be described step by step.

<Step S01: Determine Whether Turn Signal is Actuated>

The actuator control unit 210 determines whether a turn signal is actuated (whether the driver turns on the turn signal) based on an output from the turn signal switch 250.

When the turn signal is actuated, the process goes to Step S04; otherwise, the process goes to Step S02.

<Step S02: Estimate Curvature Radius of Road Ahead>

The actuator control unit 210 estimates a curvature radius r [m] of the curved road present at a predetermined distance x [m] in front of the vehicle based on outputs from the environment recognition unit 220 and the navigation device 230.

Here, when the vehicle speed is v [m/s] and a time necessary for the actuators 24 to move the shoulder blade support member 23 from a most rear end to a most front end in a movable range (drive time of the actuators 24) is t [s], the predetermined distance x is represented by the following Equation 1.

$$\text{Predetermined distance } x \text{ [m]} = v \text{ [m/s]} \times t \text{ [s]} \quad \text{(Equation 1)}$$

The process then goes to Step S03.

<Step S03: Determine Predicted Lateral Acceleration>

The actuator control unit 210 computes a lateral acceleration A generated in the vehicle when the vehicle passes the curved road at the curvature radius estimated in Step S02.

The lateral acceleration A [m/s$^2$] is calculated by dividing a square of the vehicle speed v [m/s] by the curvature radius r [m].

When the calculated lateral acceleration A is equal to or higher than 2 m/s$^2$, the process goes to Step S04; otherwise, the process goes to Step S05.

<Step S04: Enhance Rigidity for Supporting Shoulder Blades>

The actuator control unit 210 instructs the actuators 24 to move the shoulder blade support member 23 forward from a normal position that is a rear end in the movable range.

This compresses an elastic body, i.e., the cushion 21 present between the back 131 of the occupant 100 and the shoulder blade support member 23, enhancing the rigidity of the seat back 20 for supporting the shoulder blades 132.

Here, the actuators 24 may be configured to move the shoulder blade support member 23 up to a front end in the movable range.

Furthermore, the actuators 24 may be configured to increase a forward movement amount from the normal position of the shoulder blade support member 23 in proportion to an increase of the lateral acceleration A computed in Step S03.

Subsequently, a series of process steps are ended (returned).

<Step S05: Restore Rigidity for Supporting Shoulder Blades>

The actuator control unit 210 instructs the actuators 24 to hold the shoulder blade support member 23 at the normal position (to restore the shoulder blade support member 23 to the normal position when the shoulder blade support member 23 is at the other position).

This can reduce the rigidity of the seat back 20 for supporting the shoulder blades 132 to a lower limit of a range in which the actuators 24 can adjust the rigidity.

Subsequently, a series of process steps are ended (returned).

According to the embodiment described so far, the following effects can be obtained.

(1) The rigidity of the part of the seat back 20 abutting on the vicinity of the shoulder blades 132 of the occupant 100 is enhanced by feedforward control in response to the prediction of the steering operation by the occupant 100. Thus, regardless of the time taken for the actuator 24 to drive the shoulder blade support member 23, it is possible to appropriately receive a reaction force against the steering operation by the occupant 100 from an initial steering period, and improve the operability of the steering operation.

Furthermore, the rigidity is reduced for the steering operation at the normal time, making it possible to ensure comfort as well as protection performance against whiplash in case of a rear-end collision.

(2) The stereo camera device 221 and the navigation device 230 are used to recognize the lane shape in front of the vehicle, and the actuator control unit 210 predicts whether the steering operation is performed based on the lane shape. Thus, it is possible to accurately predict that the steering operation is performed before the occupant 100 starts the steering operation.

(3) It is predicted that the steering operation is performed when it is detected that the turn signal switch 250 is turned on. Thus, it is possible to predict that the steering operation accompanies a left or right turn or a change of course with simple configurations.

(4) Moving the shoulder blade support member 23 buried in the cushion 21 of the seat back 20 in the longitudinal direction changes the rigidity of the seat back 20 for supporting the vicinity of the shoulder blades 132. Thus, it is possible to sufficiently enhance the rigidity with simple configurations when the steering operation is performed.

(5) The lateral acceleration acting on the vehicle is estimated after the steering operation is performed, and the amount of enhancement in the rigidity for supporting the vicinity of the shoulder blades 132 in proportion to an increase in the lateral acceleration. Therefore, when the upper body of the occupant is affected by the lateral acceleration of the vehicle in addition to the reaction force against the steering operation, the rigidity is enhanced in response to the lateral acceleration, contributing to improving the operability of the steering operation even in a region of the high lateral acceleration.

As described so far, according to the embodiment, it is possible to provide a seat capable of improving operability of the steering operation without affecting seat performance in normal use.

Modified Example

The disclosure is not limited to the embodiment described so far and various modifications and changes are also within a technical scope of the disclosure.

(1) Configurations of the seat, the control system, the vehicle, and the like can be changed appropriately without limitation to the embodiment.

For example, shapes, structures, materials, manufacturing methods, disposition, numbers, and the like of the elements configuring the seat can be changed appropriately.

In addition, other units and sensors may be added to configurations of the control system according to the embodiment and parts of the units and the sensors may be omitted from the configurations according to the embodiment.

(2) In the embodiment, the rigidity for supporting the shoulder blades is changed by changing the position of the hard member buried in the cushion of the seat back. However, a method of changing the rigidity for supporting the shoulder blades is not limited to this and can be changed as appropriate.

(3) In the embodiment, the stereo camera device and the navigation device are used, by way of example, to recognize the lane shape of the curved road in front of the vehicle and estimate the curvature radius. However, a technique for recognizing the lane shape is not limited to this and can be changed as appropriate. For example, information related to the lane shape may be acquired by road-to-vehicle communication.

(4) In the embodiment, both the control to enhance the rigidity for supporting the shoulder blades in response to the prediction of the steering operation based on the lane shape, and the control to enhance the rigidity for supporting the shoulder blades in response to the prediction of the steering operation by operation of the turn signal switch are exercised. However, any of these controls may be exercised.

(5) In the embodiment, the shoulder blade support member is an combined part of left and right members to control the shoulder blade support member uniformly irrespective of a steering direction. Alternatively, left and right separate shoulder blade support members provided in regions near the left and right shoulder blades may be controlled independently. For example, the rigidity for supporting the shoulder blades may be configured to enhance simply on an outer side of the shoulder blades in a turning direction. In addition, while the rigidity is enhanced for supporting both the left and right shoulder blades, the rigidity may be configured to be enhanced on the outer side of the shoulder blades in the turning direction than the inner side.

The invention claimed is:

1. A seat in a vehicle, the seat comprising:
    a seat surface member configured to support a waist and thighs of an occupant seated on the seat surface member, the occupant performing a steering operation of the vehicle;
    a seat back configured to abut on a back of the occupant;
    an actuator including:
        an electric motor;
        a reduction gear; and
        a mechanism that transforms a rotational motion to a translational motion; and
    an actuator control processor that:
        transmits an actuation instruction to the actuator that changes a rigidity of a part of the seat back abutting on a vicinity of shoulder blades of the occupant via operation of the mechanism;
        predicts whether the steering operation is performed; and
        controls the actuator that increases the rigidity, via the mechanism, of a part of the seat back abutting on a vicinity of shoulder blades of the occupant before the steering operation is started when it is predicted that the steering operation is performed.

2. The seat according to claim 1, further comprising a sensor configured to recognize a lane shape in front of the vehicle and transmit a result to the actuator control processor,
    wherein, based on the lane shape, the actuator control processor predicts whether the steering operation is performed.

3. The seat according to claim 2, wherein the seat back comprises an elastic body disposed to be opposed to the back of the occupant,
    wherein the part of the seat back abutting on the vicinity of shoulder blades of the occupant includes a hard member harder than the elastic body and disposed to sandwich part of the elastic body between the hard member and an upper body of the occupant,
    wherein the actuator, via the mechanism, drives the hard member in a direction of approaching or separating from the upper body of the occupant.

4. The seat according to claim 2, wherein the actuator control processor:
    estimates a lateral acceleration acting on the vehicle after the steering operation is performed; and
    increase, via the mechanism, an amount of the rigidity in proportion to an improvement in the lateral acceleration.

5. The seat according to claim 1, further comprising a turn signal operation detector that detects a turn signal operation by the occupant,
    wherein, based on the turn signal operation being detected, the actuator control processor predicts that the steering operation is performed.

6. The seat according to claim 5, wherein the seat back comprises an elastic body disposed to be opposed to the back of the occupant,
wherein the part of the seat back abutting on the vicinity of shoulder blades of the occupant includes a hard member harder than the elastic body and disposed to sandwich part of the elastic body between the hard member and an upper body of the occupant,
wherein the actuator, via the mechanism, drives the hard member in a direction of approaching or separating from the upper body of the occupant.

7. The seat according to claim 5, wherein the actuator control processor:
estimates a lateral acceleration acting on the vehicle after the steering operation is performed; and
increase, via the mechanism, an amount of the rigidity in proportion to an improvement in the lateral acceleration.

8. The seat according to claim 1, wherein the seat back comprises an elastic body disposed to be opposed to the back of the occupant,
wherein the part of the seat back abutting on the vicinity of shoulder blades of the occupant includes a hard member harder than the elastic body and disposed to sandwich part of the elastic body between the hard member and an upper body of the occupant,
wherein the actuator, via the mechanism, drives the hard member in a direction of approaching or separating from the upper body of the occupant.

9. The seat according to claim 1, wherein the actuator control processor:
estimates a lateral acceleration acting on the vehicle after the steering operation is performed; and
increase, via the mechanism, an amount of the rigidity in proportion to an improvement in the lateral acceleration.

10. The seat according to claim 1, wherein the hard member is disposed at a height along a surface of the seat back from the seat surface member within a range of 440 mm to 470 mm to align with the vicinity of the shoulder blades of the occupant.

11. The seat according to claim 1, wherein the hard member comprises a left hard member and a right hard member, each disposed to align with a respective left shoulder blade and right shoulder blade of the occupant,
wherein the actuator comprises a left actuator drives the left hard member and a right actuator drives the right hard member, and
wherein the actuator control processor independently controls the left actuator and the right actuator to adjust the rigidity of the part of the seat back abutting on the vicinity of the respective left and right shoulder blades.

12. The seat according to claim 11, wherein, when it is predicted that the steering operation will be performed in a turning direction, the actuator control processor increases the rigidity of the part of the seat back abutting on the shoulder blade on an outer side of the turning direction more than the rigidity on an inner side of the turning direction.

13. The seat according to claim 1, further comprising a stereo camera device that captures images of a road in front of the vehicle,
wherein the actuator control processor predicts whether the steering operation will be performed based on a lane shape recognized from the images captured by the stereo camera device.

14. The seat according to claim 1, further comprising a navigation device that provides map data including a curvature radius of a curved road ahead of the vehicle,
wherein the actuator control processor predicts whether the steering operation will be performed based on the curvature radius.

15. The seat according to claim 1, wherein the actuator control processor:
estimates a curvature radius of a curved road ahead of the vehicle;
computes a predicted lateral acceleration based on the curvature radius and a vehicle speed; and
controls the actuator to increase the rigidity when the predicted lateral acceleration is equal to or greater than 2 m/s$^2$.

16. The seat according to claim 1, wherein the actuator control processor moves the hard member to a normal position at a rear end of a movable range when no steering operation is predicted, thereby reducing the rigidity of the part of the seat back to a lower limit of an adjustable range.

17. A seat, the seat comprising:
a seat surface member configured to support a waist and thighs of an occupant seated on the seat surface member, the occupant performing a steering operation of the vehicle;
a seat back configured to abut on a back of the occupant;
an actuator including:
an electric motor;
a reduction gear; and
a mechanism that transforms a rotational motion to a translational motion; and
circuitry that;
transmits an actuation instruction to the actuator that changes a rigidity of a part of the seat back abutting on a vicinity of shoulder blades of the occupant via operation of the mechanism;
predicts whether the steering operation is performed; and
controls the actuator to increase the rigidity, via the mechanism, of a part of the seat back abutting on a vicinity of shoulder blades of the occupant before the steering operation is started when it is predicted that the steering operation is performed.

18. The seat according to claim 17, wherein the hard member is disposed at a height along a surface of the seat back from the seat surface member within a range of 440 mm to 470 mm to align with the vicinity of the shoulder blades of the occupant.

19. The seat according to claim 17, wherein the hard member comprises a left hard member and a right hard member, each disposed to align with a respective left and right shoulder blade of the occupant,
wherein the actuator comprises a left actuator drives the left hard member and a right actuator drives the right hard member, and
wherein the circuitry independently controls the left actuator and the right actuator to adjust the rigidity of the part of the seat back abutting on the vicinity of the respective left and right shoulder blades.

20. The seat according to claim 19, wherein, when it is predicted that the steering operation will be performed in a turning direction, the circuitry increases the rigidity of the part of the seat back abutting on the shoulder blade on an outer side of the turning direction more than the rigidity on an inner side of the turning direction.

* * * * *